(12) United States Patent
Yasuno

(10) Patent No.: US 6,736,053 B1
(45) Date of Patent: May 18, 2004

(54) METHOD AND DEVICE FOR MAKING CRAB-LEG-MEAT-LIKE PRODUCT MADE WITH BOILED FISH PASTE

(76) Inventor: Shigeo Yasuno, No. 10-24, Toneri 4-chome, Adachi-ku, Tokyo (JP)

( * ) Notice: Subject to any disclaimer, the term of this patent is extended or adjusted under 35 U.S.C. 154(b) by 0 days.

(21) Appl. No.: 09/807,609

(22) PCT Filed: Jun. 16, 1999

(86) PCT No.: PCT/JP99/03212

§ 371 (c)(1),
(2), (4) Date: Apr. 16, 2001

(87) PCT Pub. No.: WO00/21392

PCT Pub. Date: Apr. 20, 2000

(30) Foreign Application Priority Data

Oct. 15, 1998 (JP) .......................................... 10-293678
Mar. 17, 1999 (JP) .......................................... 11-072521

(51) Int. Cl.[7] ................................................ A23P 1/00
(52) U.S. Cl. ...................... 99/450.1; 99/450.2; 425/301
(58) Field of Search .............................. 99/450.1, 450.2; 425/289, 301

(56) References Cited

FOREIGN PATENT DOCUMENTS

| JP | 63-126472 | | 5/1988 |
|----|-----------|---|--------|
| JP | 3-58772 | * | 3/1991 |
| JP | 3-65164 | * | 3/1991 |
| JP | 3-49666 | | 4/1991 |
| JP | 9-262070 | | 7/1997 |

* cited by examiner

*Primary Examiner*—George C. Yeung
(74) *Attorney, Agent, or Firm*—Browdy and Neimark, P.L.L.C.

(57) ABSTRACT

An apparatus for automatically producing at low cost a paste food product resembling in appearance a crab's leg meat tissue causing a sensation of a crab's leg meat upon eating, comprises: a first feed device (1) for feeding a cooked paste sheet; a sheet cutter assembly (4) constructed of parallel rotary cutters disposed under the first feed device (1); a convergent roll assembly (9) having an H-shaped cross-section for forming the paste sheet into a folded sheet (10), disposed under the first feed device (1); a conveyor (12) for conveying the folded sheet (10), disposed under the convergent roll assembly (9); a second feed device (14) for intermittently or continuously feeding the folded sheet (10), disposed in front of the conveyor (12); a slitting machine (17) for forming rows of parallel oblique slits in the folded sheet (10) so as to have the parallel oblique slits symmetrically arranged about a longitudinal axis of the folded sheet (10); and, a cutter for cutting the folded sheet into a block having a predetermined length, disposed over an end portion of the conveyor (12).

4 Claims, 13 Drawing Sheets

(a)

(b)

METHOD AND DEVICE FOR MAKING CRAB-LEG-MEAT-LIKE PRODUCT MADE WITH BOILED FISH PASTE

REFERENCE TO RELATED APPLICATIONS

The present application is the national stage under 35 U.S.C. §371 of international application PCT/JP99/03212, filed Jun. 16, 1999, which designated the United States, and which application was not published in the English language.

TECHNICAL FIELD

The present invention relates to a method and apparatus for producing a paste food product resembling in appearance a crab's leg meat tissue, wherein the paste food product is substantially made of a fish paste and the like, which is partitioned into a plurality of elongated segments by means of a plurality of parallel oblique slits and longitudinal slits to cause a sensation of crab's leg meat to the teeth upon eating.

BACKGROUND ART

Although various paste food products of the above-mentioned types and various methods for producing such paste food products have been previously proposed, a need exists in the art for a method and apparatus for producing a paste food product resembling in appearance a crab's leg meat tissue, in an easy manner, at low cost through the lowest possible number of process steps, wherein the paste food product is substantially made of a fish paste and the like which is partitioned into a plurality of elongated segments by means of a plurality of parallel oblique slits and longitudinal slits to cause a sensation of crab's leg meat to the teeth upon eating.

DISCLOSURE OF INVENTION

In accordance with a first aspect of the present invention, the above object of the present invention is accomplished by providing:

A method for producing a paste food product resembling in appearance a crab's leg meat tissue, comprising the steps of:
  forming a cylindrical body having a predetermined diameter winding up a paste sheet; and
  forming a plurality of rows of parallel oblique slits in the cylindrical body so as to have the rows of the parallel oblique slits symmetrically arranged about a longitudinal axis of the cylindrical body, the parallel oblique slits being spaced apart from each other at predetermined narrow intervals in each of the rows to assume a feathery-branched block shape.

In accordance with a second aspect of the present invention, the above object of the present invention is accomplished by providing:

A method for producing a paste food product resembling in appearance a crab's leg meat tissue, comprising the steps of:
  stacking a plurality of paste sheets into a pile;
  cutting the pile into a predetermined-width piece when a width of the pile is not equal to a predetermined width;
  forming a plurality of rows of parallel oblique slits in the predetermined-width piece so as to have the rows of the parallel oblique slits symmetrically arranged about a longitudinal axis of the predetermined-width piece, the parallel oblique slits being spaced apart from each other at predetermined narrow intervals in each of the rows to assume a feathery-branched block shape; and
  cutting the predetermined-width piece into a plurality of feathery-branched blocks.

In accordance with a third aspect of the present invention, the above object of the present invention is accomplished by providing:

A method for producing a paste food product resembling in appearance a crab's leg meat tissue, comprising the steps of:
  forming a plurality of full or partial partitioning lines in a paste sheet to extend in a direction in which the paste sheet is moved;
  folding the paste sheet along the partitioning lines into a folded sheet;
  intermittently or continuously feeding the folded sheet;
  forming a plurality of slits in the folded sheet thus fed to form the folded sheet into a raw product resembling in appearance a crab's leg meat tissue; and
  cutting the raw product into a plurality of blocks each having a predetermined length.

In accordance with a fourth aspect of the present invention, the above object of the present invention is accomplished by providing:

An apparatus for producing a paste food product resembling in appearance a crab's leg meat tissue, comprising:
  a sheet cutter assembly constructed of a plurality of parallel rotary cutters which are arranged side by side and disposed under a first feed means for feeding a paste sheet;
  a convergent roll assembly for forming the paste sheet into a folded sheet, the convergent roll assembly having an H-shaped cross section and being disposed under the first feed means;
  a conveyor for conveying the folded sheet, the conveyor being disposed under the convergent roll assembly;
  a second feed means for intermittent or continuously feeding the folded sheet, the second feed means being disposed in front of the conveyor;
  a slitting machine, which is disposed under the second feed means, for forming a plurality of rows of parallel oblique slits in the folded sheet so as to have the rows of the parallel oblique slits symmetrically arranged about a longitudinal axis of the folded sheet, the parallel oblique slits being spaced apart from each other at predetermined narrow intervals in each of the rows to assume a feathery-branched block shape; and
  a cutter for cutting the folded sheet provided with the parallel oblique slits into a plurality of blocks each having a predetermined length, the cutter being disposed over an end portion of the conveyor.

BEST MODE FOR CARRYING OUT THE INVENTION

Figure 1:
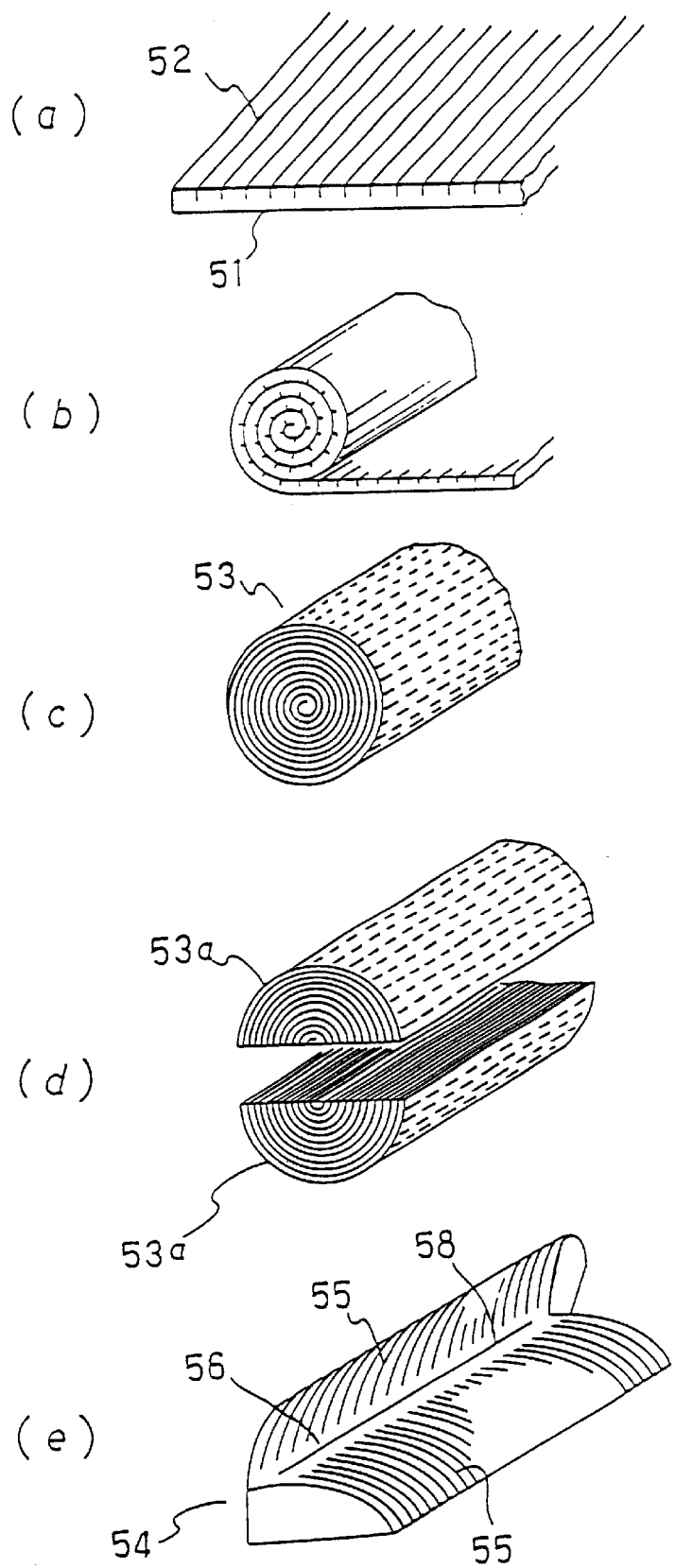
FIGS. 1(*a*)–1(*e*) provide a perspective view showing a method according to the first aspect of the present invention.

The best modes for carrying out the present invention will be described in detail using embodiments of the present invention with reference to the accompanying drawings.

With reference to FIGS. 1(a) to 1(e), a first embodiment of a method of the present invention for producing a paste food product resembling in appearance a crab's leg meat tissue will be described.

In this first embodiment of the method of the present invention, first of all, a paste sheet 51 having a thickness of from 1 to 1.5 mm is prepared. Then, as shown in FIG. 1(a), a plurality of parallel straight slits 52 are formed in the paste sheet 51 at predetermined equal intervals, for example, at intervals of 1 mm in a process step (a). In general, a depth of each of the straight slits 52 is within a range of from ½ to ⅔ of the thickness of the paste sheet 51.

The paste sheet 51 is substantially prepared from kneaded raw materials, which comprise: fish meat of cod (i.e., Theragra chalcogramma) and like fishes; starch; salt; spices; albumen; and, like materials. In order to prepare the kneaded raw materials with a crab flavor, it suffices to blend a small amount (for example, 3 to 5%) of the paste of shells (or low-quality meats) of crabs, lobsters, shrimps, or, of like crustacean with the kneaded raw materials. It is also possible to additionally blend a crab-flavor additive and calcium with the kneaded raw materials. Incidentally, in most cases of existing production lines, a frozen block of a fish paste is ground in a mill together with salt.

In the first embodiment of the method of the present invention, the paste sheet 51 with the straight slits 52 shown in FIG. 1(a) may be either an uncooked one or a cooked one in use.

As shown in FIGS. 1(b) and 1(c), the paste sheet 51 is wound to form a cylindrical body 53 having a diameter of from about 2 to about 3 cm in process steps (b) and (c), wherein the process step (b) is subsequent to the process step (a) and the process step (c) is subsequent to the process step (b). If necessary, as shown in FIG. 1(d), the cylindrical body 53 thus formed is longitudinally divided into two elongated pieces, i.e., two semi-cylindrical body 53a in a process step (d) subsequent to the process step (c). Then, as shown in FIG. 1(e), the cylindrical body 53 of FIG. 1(c) or the semi-cylindrical body 53a of FIG. 1(d) is cut to form a feathery-branched block 54 in a process step (e) subsequent to the process step (d). In this case, the feathery-branched block 54 prepared from the cylindrical body 53 is more rounded in outer peripheral surface than that prepared from the semi-cylindrical body 53a.

Figure 2:
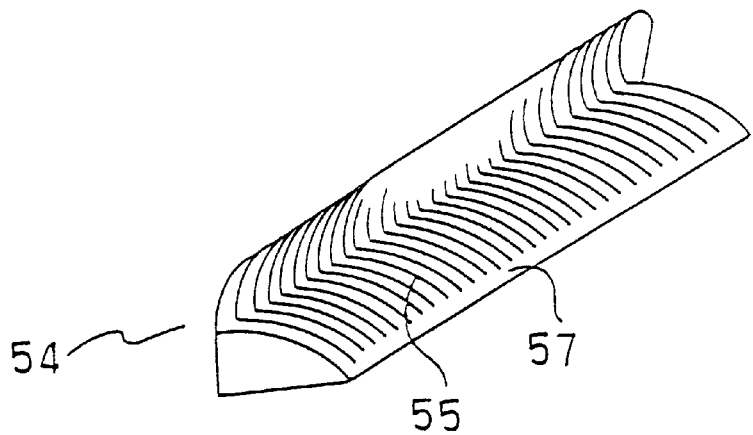
FIG. 2 is a perspective view of a modification of the block shown in FIG. 1(*e*)

In forming the feathery-branched block 54 of FIG. 1(e), a plurality of rows of parallel oblique slits 55 are formed in the feathery-branched block 54 in a manner such that: the rows of the parallel oblique slits 55 are symmetrically arranged about a longitudinal axis of the feathery-branched block 54; and, the parallel oblique slits 55 are spaced apart from each other at predetermined narrow intervals in each of the rows to assume a feathery-branched block shape. As shown in FIG. 1(e), the feathery-branched block 54 may have its central area be a blank area 56 free from the parallel oblique slits 55. In other words, the parallel oblique slits 55 may obliquely extend from such a blank area 56 of the feathery-branched block 54 to the opposite sides of the block 54, as shown in FIG. 1(e). Alternatively, as shown in FIG. 2, it is also possible for the feathery-branched block 54 to dispose a pair of its blank area 57 in its opposite sides, so that the parallel oblique slits 55 may extend from one of the opposite sides to the other in the feathery-branched block 54. Further, it is also possible for the feathery-branched block 54 to form a longitudinal slit 58 in its central area (i.e., blank area) 56, as shown in FIG. 1(e). In depth, each of these slits 55, 58 may reach a lower surface of the feathery-branched block 54. In other words, a depth of each of these slits 55, 58 may vary within a thickness of the feathery-branched block 54, as is clear from FIG. 1(e). The feathery-branched block 54 thus prepared and cut is then wrapped with an appropriate color wrapping film, and heated or cooked again to become a completed food product.

Figure 3:
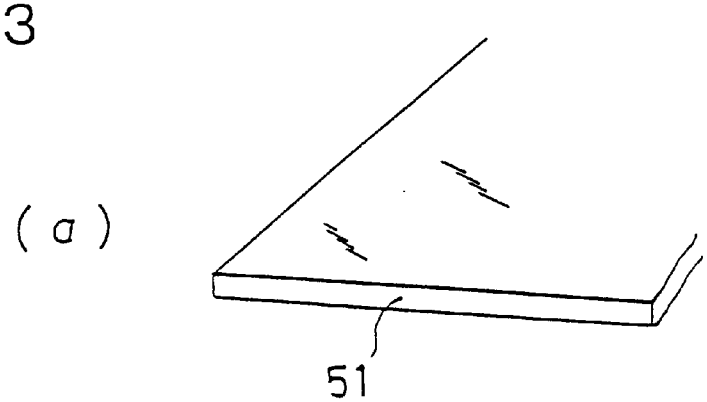
FIGS. 3(*a*) and 3(*b*) provide a perspective view showing a method according to the second aspect of the present invention.
Figure 3:
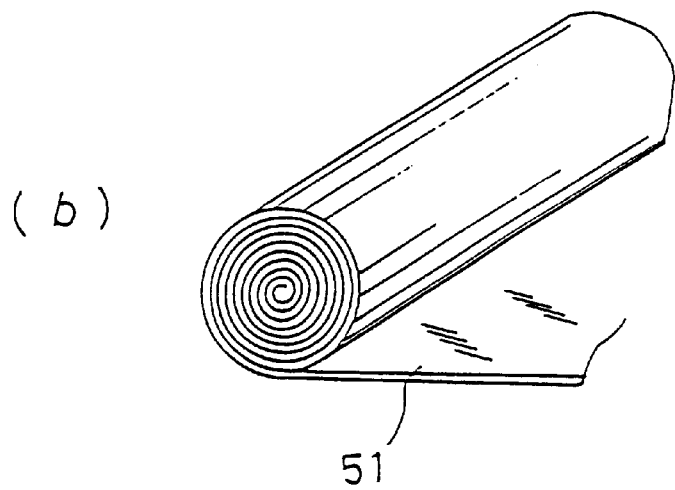

FIGS. 3(a) and 3(b) show a second embodiment of the method of the present invention. This second embodiment is substantially similar to the first embodiment of the method of the present invention shown in FIGS. 1(a) to 1(e), except that the parallel straight slits 52 are not formed in the paste sheet 51 shown in FIGS. 3(a) and 3(b). Consequently, the process steps subsequent to the process step (c) are not described again here to avoid redundancy in description. The food product produced by the second embodiment of the method of the present invention lacks the parallel straight slits 52 shown in FIG. 1(a), and is therefore slightly harder to eat than that produced by the first embodiment of the method of the present invention.

Figure 4:
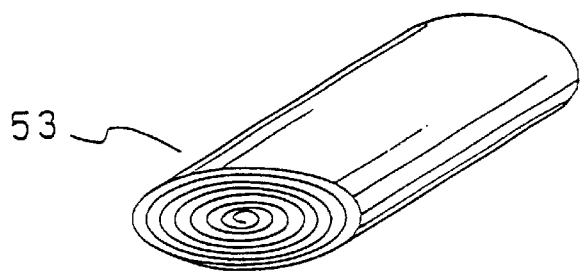
FIG. 4 is a perspective view of a cylindrical body formed of the paste sheet shown in FIG. 3(*a*), illustrating an oval-faced end portion of the cylindrical body.

A third embodiment of the method of the present invention is shown in FIG. 4. This third embodiment is substantially similar to the first or the second embodiment of the method of the present invention, except that the paste sheet 51 shown in FIG. 3(*a*) is wound to form a cylindrical body 53 having an oval shape in cross section as is clear from FIG. 4. The food product produced by the third embodiment of the method of the present invention is more flattened in shape than that produced by the first or the second embodiment of the method of the present invention.

Figure 5:
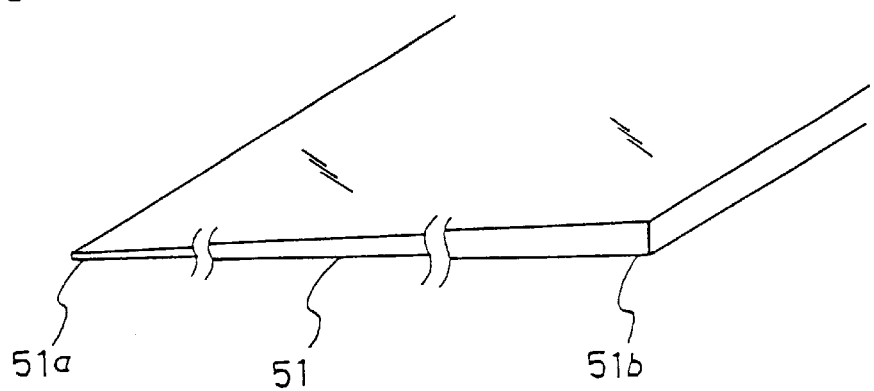
FIG. 5 is a perspective view of a paste sheet gradually increasing in thickness.

The paste sheet 51 used in each of the first, second and the third embodiment of the method of the present invention may be constant in thickness as a whole. However, it is also possible for the paste sheet 51 to vary its thickness, for example, as shown in FIG. 5 in which the paste sheet 51 has its thickness gradually increase from its winding start portion to its winding end portion. The paste sheet 51 shown in FIG. 5 may enhance its winding operation for forming the cylindrical body 53. Further, the cylindrical body 53 formed of the paste sheet 51 of FIG. 5 may be more compacted than that formed of the paste sheet 51 of FIG. 3(*a*).

Further, in any one of the above embodiments of the method of the present invention, it is possible to previously cut the paste sheet 51 into a predetermined size. Alternatively, it is also possible to cut the cylindrical body 53 after the paste sheet 51 is wound to form such cylindrical body 53. In the latter case, it is possible to cut the cylindrical body 53 when the feathery-branched block 54 is formed.

Figure 6:
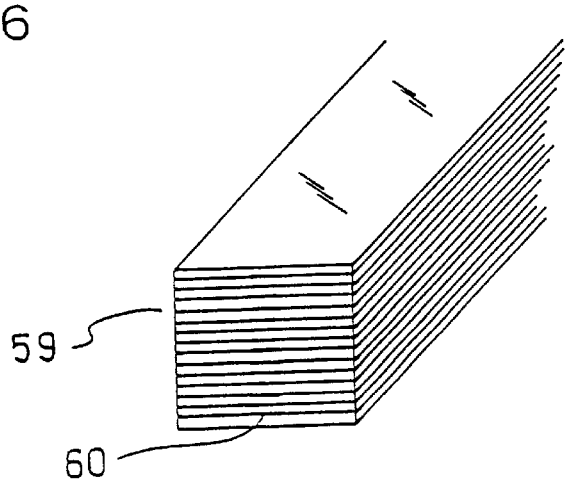
FIG. 6 is a perspective view of a plurality of paste sheets having been stacked into a neat pile.
Figure 7:
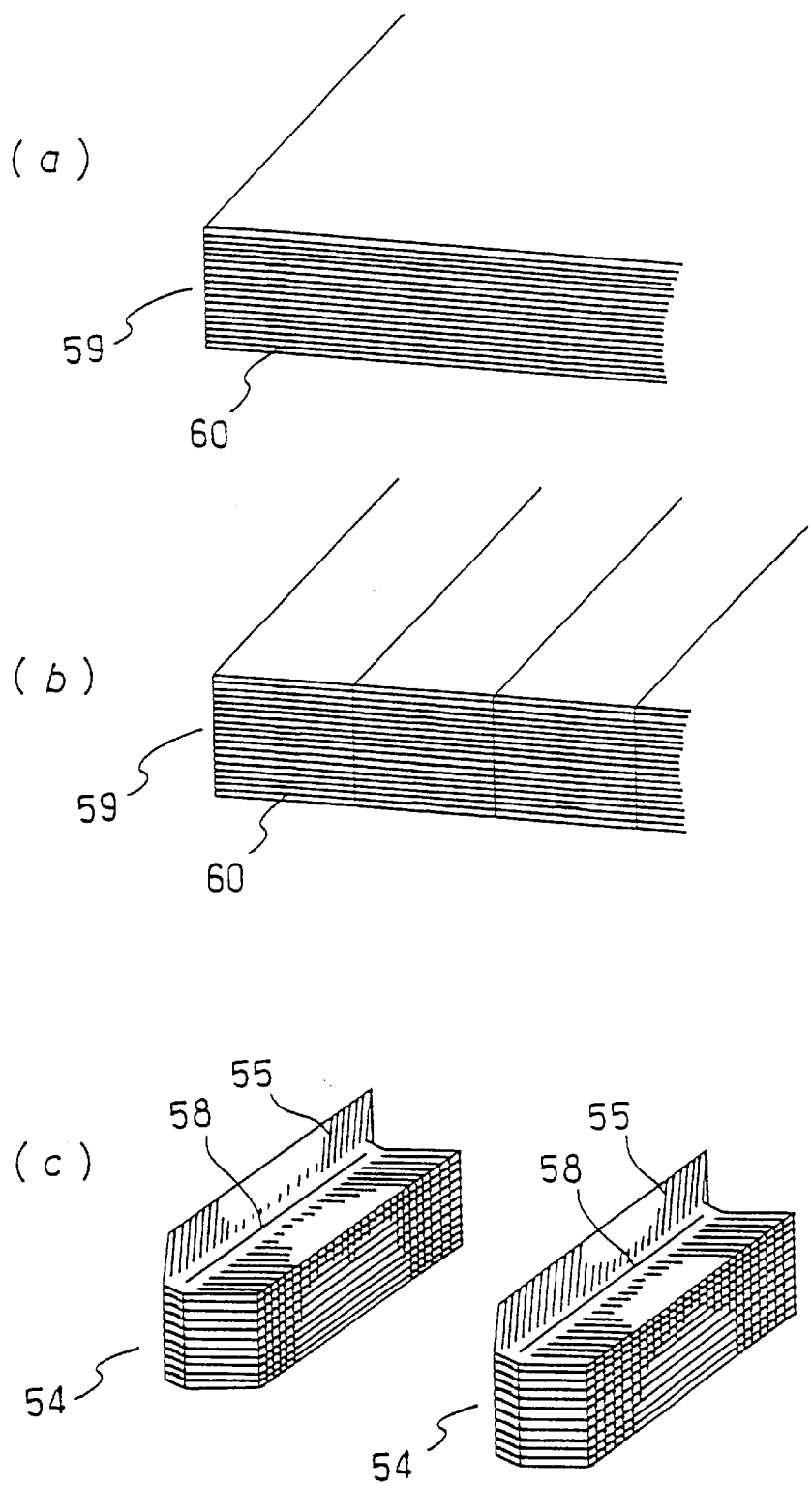
FIGS. 7(a)–7(c) provide a perspective view showing a method according to the third aspect of the present invention.
Figure 8:
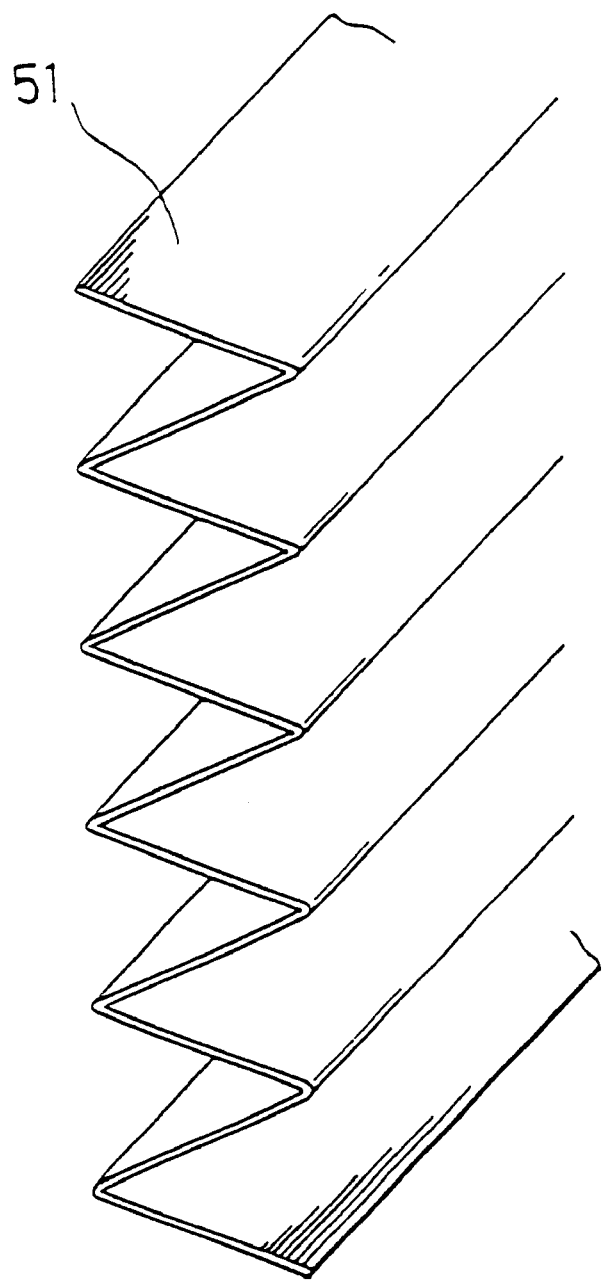
FIG. 8 is a perspective view of a paste sheet bent in a zigzag manner in accordance with the present invention.
Figure 18:
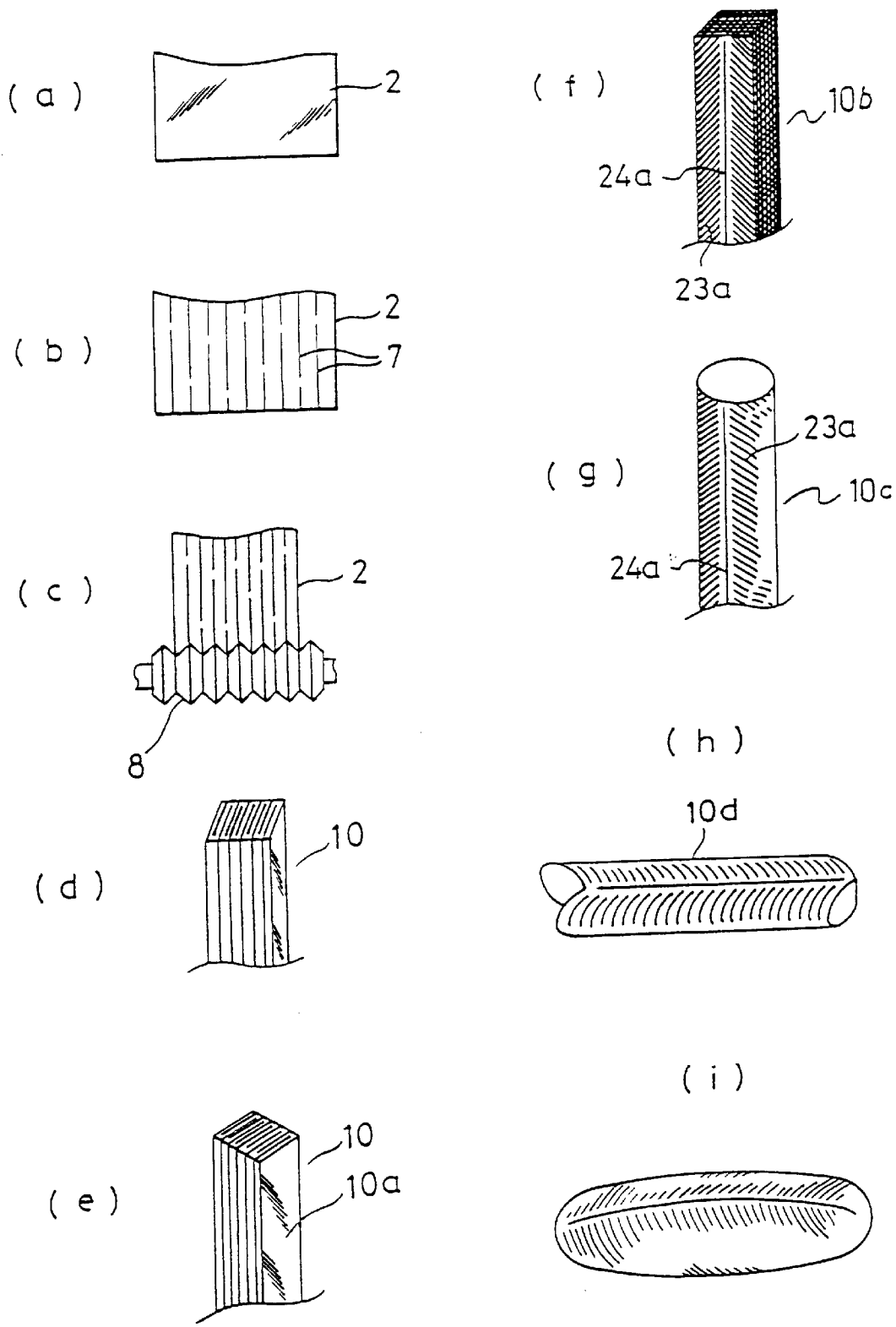
FIGS. 18(a)–18(i) provide a view showing the manufacturing process according to the apparatus of the present invention.

FIGS. 6, 7(*a*) and 7(*b*) show a stacking process for stacking a plurality of the paste sheets 51 into a pile or laminated element 59. FIG. 6 shows an example of this stacking process, wherein a plurality of the paste sheets 51 each of which is previously cut to have a predetermined width are stacked to form the laminated element 59 having the predetermined width. In another example of the stacking process shown in FIGS. 7(*a*) and 7(*b*), a plurality of the paste sheets 51 are stacked to form a single large-sized one of the laminated element 59 as shown in FIG. 7(*a*), and then cut into a plurality of the small-sized ones of the laminated elements 59 each of which has a predetermined width. As shown in FIG. 8, there is further another example of the stacking process, in which the paste sheet 51 assuming an elongated shape is bent in a zigzag manner, and then folded into the laminated element, i.e., folded sheet 10, as shown in FIG. 18(*d*). The stacking process for stacking the paste sheets 51 having been already cooked differs from the stacking process for stacking the paste sheets 51 which are still raw.

The raw ones of the paste sheets 51 are more adhesive than the cooked ones, and therefore hard to separate from each other after they are stacked. Consequently, in the stacking process for stacking the raw paste sheets 51 only, it is necessary to spray water or apply egg white or starch onto each of the raw paste sheets 51 each time the raw paste sheet 51 is stacked. After all the raw paste sheets 51 are stacked to form the laminated element 59, such laminated element 59 is cooked, and transferred to a subsequent process step for forming a plurality of rows of parallel oblique slits 55. In the example of the stacking process shown in FIGS. 7(*a*) and 7(*b*), a process step (b) for cutting the large-sized one of the laminated element 59 of FIG. 7(*a*) at predetermined intervals to form a plurality of the small-sized ones of the laminated elements 59 of FIG. 7(*b*) is followed by the process step for forming the parallel oblique slits 55 shown in FIG. 7(*c*) in which the small-sized laminated element 59 has its opposite end portions cut in substantially v-shaped form to form another type of the feathery-branched block 54.

In contrast with the above case, in the case of the paste sheets 51 having been already cooked, the cooked ones of the paste sheets 51 are poor in adhesive properties. Consequently, it is necessary to insert the raw one of the paste sheets 51 between adjacent ones of the cooked paste sheets 51, or insert a raw paste sheet 60, which assumes a stripe shape to serve as adhesive means, between adjacent ones of the cooked paste sheets 51. Also in these cases, the process step for forming the parallel oblique slits 55 is performed after the laminated element 59 is cooked again. The details of the process step shown in FIG. 7(*c*) for forming the parallel oblique slits 55 in the laminated element 59 are the same as those described above with reference to FIGS. 1(*e*) and 2. If necessary, the longitudinal slit 58 may be formed in the central area of the feathery-branched block 54, as shown in FIG. 7(*c*) as is in the example shown in FIG. 1(*e*).

Now, an apparatus of the present invention for producing the paste food product resembling in appearance the crab's leg meat tissue will be described with reference to FIGS. 9 to 20(B).

Figure 9:
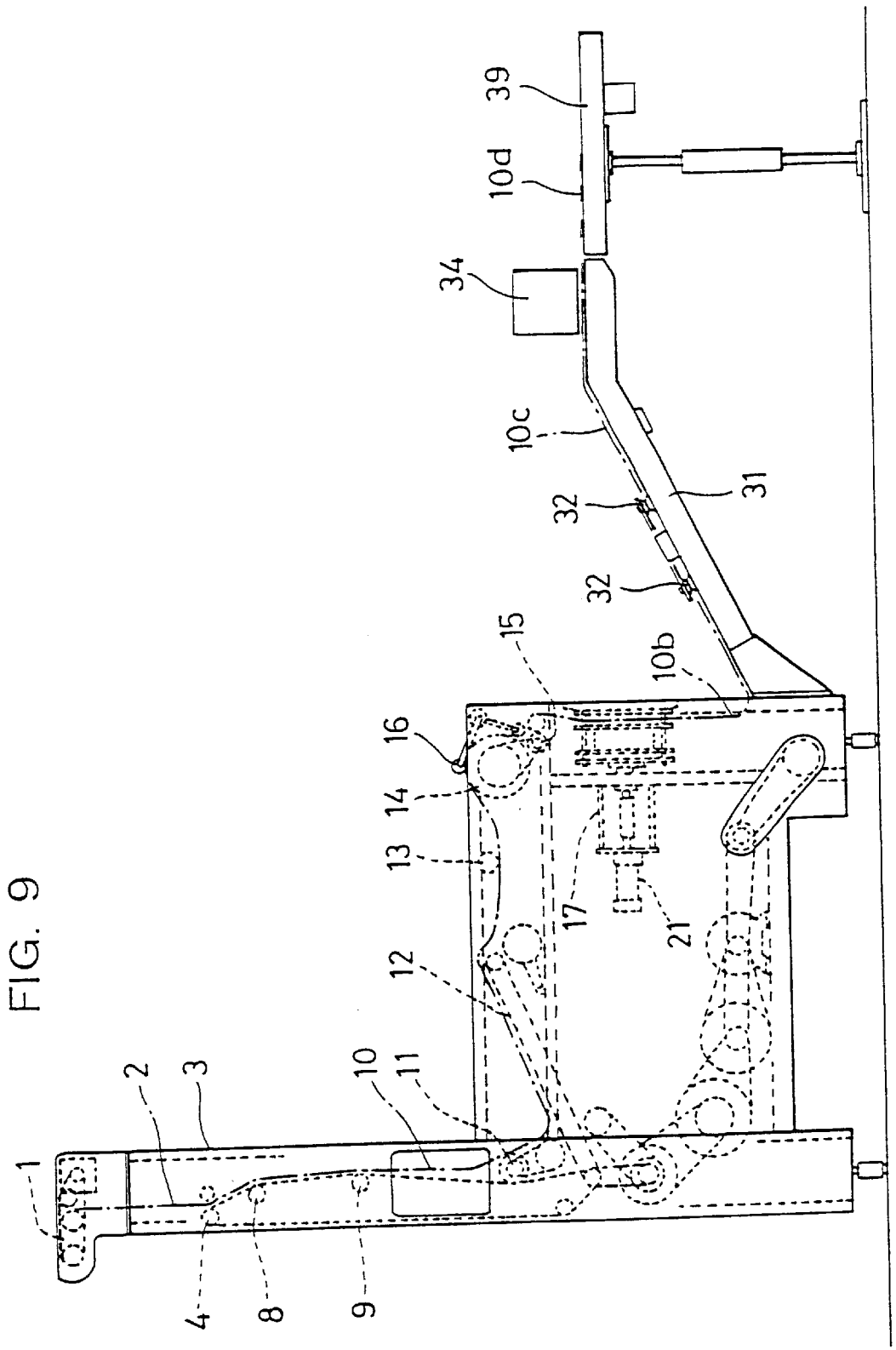
FIG. 9 is a schematic front view of a first embodiment of an apparatus of the present invention for producing a paste food product resembling in appearance a crab's leg meat tissue.
Figure 10:
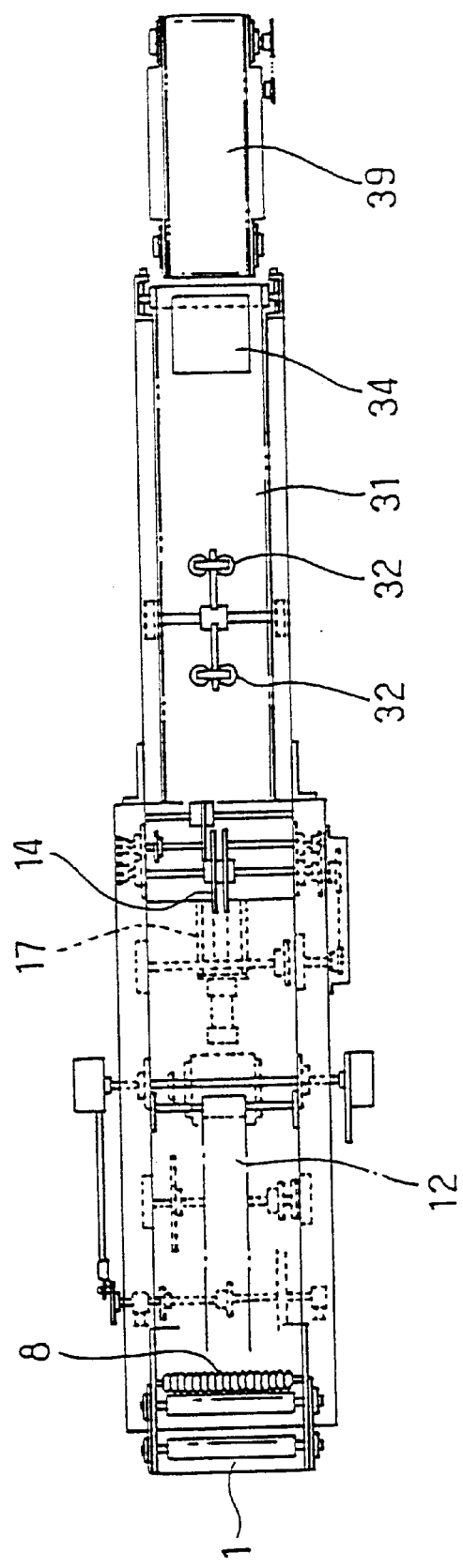
FIG. 10 is a schematic plan view of the first embodiment of the apparatus of the present invention shown in FIG. 9.

FIG. 9 shows a schematic front view of a first embodiment of the apparatus of the present. FIG. 10 show a schematic plan view of the first embodiment of the apparatus of the present invention shown in FIG. 9, in which the reference numeral 1 denotes a first conveyor for feeding the cooked paste sheets 2 to an essential part of the apparatus of the present invention. This first conveyor 1 is provided in an upper end portion of a vertical frame 3 of the apparatus of the present invention.

Figure 11:
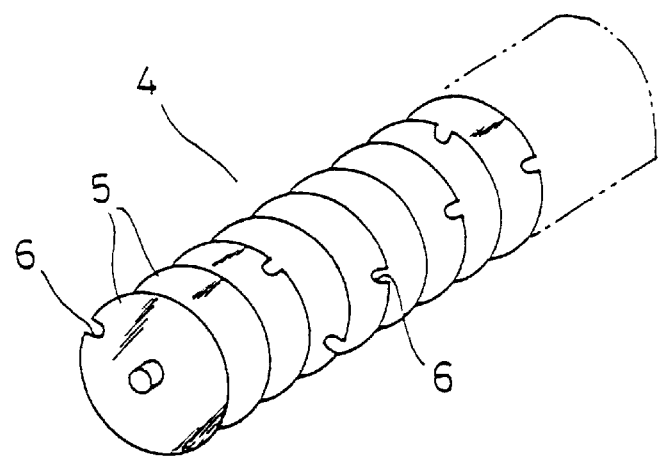
FIG. 11 is a perspective view of a sheet cutter assembly of the apparatus of the present invention shown in FIG. 9.

As shown in FIG. 9, mounted in an upper portion of the vertical frame 3 of the apparatus of the present invention is a sheet cutter assembly 4 constructed of a plurality of parallel rotary cutters 5. As is clear from FIG. 11, these rotary cutters 5 are arranged side by side and spaced apart from each other at predetermined equal intervals in the sheet cutter assembly 4. Each of the rotary cutters 5 may be provided with a notched portion 6 in the sheet cutter assembly 4, provided that these notched portions 6 of the rotary cutters 5 are prevented from being axially aligned with each other in the sheet cutter assembly 4, as shown in FIG. 11. The number of the notched portions 6 provided in each of the rotary cutters 5 of the sheet cutter assembly 4 may be increased when each of the rotary cutters 5 is increased in diameter.

In operation, as shown in FIG. 9, the sheet cutter assembly 4 is used to form a plurality of full or partial partitioning lines 7 in the cooked paste sheet 2 in a direction in which the paste sheet 2 is moved, so that the cooked paste sheet 2 is cut into a plurality of straps each having a width of, for example, approximately 1.5 cm. In this case, these straps may be partially or completely separated from each other. It is also possible to form the plurality of the partitioning lines 7 in the paste sheet 2 by means of the sheet cutter assembly 4 in a manner such that a depth of each of the partitioning lines 7 is slightly less than the thickness of the paste sheet 2, whereby a lower thin layer of the paste sheet 2 remains uncut. When the notched portion 6 is provided in each of the rotary cutters 5 in the sheet cutter assembly 4, each of these partitioning lines 7 is intermittently formed to assume a dotted line in appearance, as shown in FIG. 18(*b*). Uncut portions of adjacent ones of the partitioning lines 7 in the paste sheet 2 are not aligned with each other in a direction perpendicular to these partitioning lines.

Incidentally, when the notched portion 6 is not provided in each of the rotary cutters 5 of the sheet cutter assembly 4 at all, each of these partitioning lines 7 becomes a straight line in appearance. Even when the paste sheet 2 is completely cut into a plurality of the straps without permitting the above-mentioned lower thin layer of the paste sheet 2 to remain uncut, there is no fear that the individual straps of the paste sheet 2 separate from each other since these straps are still sufficiently adhesive.

Disposed under the sheet cutter assembly 4 is a sawtoothed or wave-shaped roll 8 serving as a folding roll in function. As is clear from FIG. 18(*c*), the saw-toothed roll 8 assumes a wavy shape in contour of its longitudinal section, and is brought into press-contact with the paste sheet 2 having been provided with the plurality of the partitioning lines 7, so that the paste sheet 2 is bent along its partitioning lines 7 in a zigzag manner in cross section as is in the case of the paste sheet 51 shown in FIG. 8, which enhances a process step for folding the paste sheet 2 subsequent to the process step shown in FIG. 18(*c*) for bending the paste sheet 2 in the zigzag manner in cross section.

Figure 12:
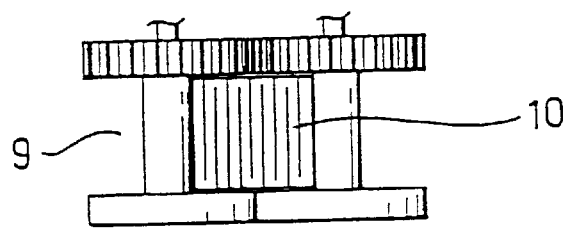
FIG. 12 is a plan view of a convergent roll assembly of the apparatus of the present invention shown in FIG. 9.
Figure 13:
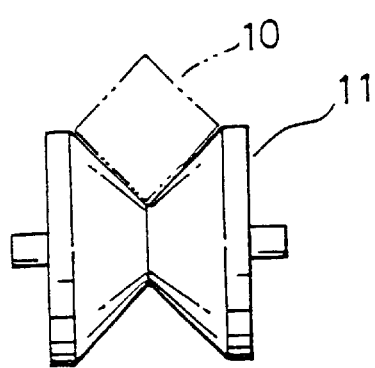
FIG. 13 is a front view of a twist roll of the apparatus of the present invention shown in FIG. 9.

In FIG. 9, the reference numeral 9 denotes a convergent roll assembly disposed under the saw-toothed roll 8. The convergent roll assembly 9 is constructed of a pair of H-shaped rolls as shown in FIG. 12. The cooked paste sheet 2 having been bent in the zigzag manner in cross section is received by this convergent roll assembly 9, and folded along these partitioning lines 7 therein into a folded sheet 10 assuming a rectangular shape in cross section, as shown in FIG. 18(*d*). A distance between the convergent roll assembly 9 and the saw-toothed roll 8 should be as long as possible. When this distance is too short, the paste sheet 2 is rapidly folded and therefore subjected to an excessively large stress, which often deforms the resultant folded sheet 10.

Disposed under the convergent roll assembly 9 is a twist roll 11 for twisting the folded sheet 10 through an angle of 90 degrees. The folded sheet 10 thus twisted by the twist roll 11 has its flat surface 10*a* (which is free from any partitioning lines 7, as shown in FIG. 18(*e*)) oriented upward on a second conveyor 12 which is disposed under the twist roll 11. The second conveyer 12 transfers the folded sheet 10 in a horizontal direction. As is clear from FIG. 13, the twist roll 11 is provided with an annular groove in its outer peripheral surface. This annular groove of the twist roll 11 assumes a V-shaped form in cross section, wherein the V-shaped from is constructed of a pair of annular oblique surfaces symmetrically arranged with respect to a center plane which is perpendicular to a longitudinal axis of the twist roll 11 and passes through a center of this longitudinal axis of the twist roll 11. An angle formed between each of these annular oblique surfaces of the twits roll 11 and the above center plane is equal to an angle of 45 degrees, as is clear from FIG. 13. In the twisting operation of the folded sheet 10, the folded sheet 10 is brought into contact with this V-shaped annular groove of the twist roll 11 and twisted through an angle of 45 degrees.

When only one of the twist roll 11 is provided in the apparatus of the present invention, it is necessary to further twist the folded sheet 10 through an additional angle of 45 degrees. In order to meet this necessity, preferably, an additional twist roll is disposed under the twist roll 11 so that the folded sheet 10 is twisted through an angle of 90 degrees by both the twist roll 11 and the additional twist roll, whereby the folded sheet 10 having been twisted through an angle of 90 degrees is received by the second conveyor 12.

In FIG. 9, the reference numeral 13 denotes a positioning roll assuming an H-shaped form in longitudinal section. At least one of the positioning roll 13 is provided between the second conveyor 12 and an intermittently feeding roll 14, as shown in FIG. 9. In operation, the positioning roll 13 supports the folded sheet 10 to prevent the folded sheet 10 from laterally deviating in its transfer path, which ensures that the folded sheet 10 is properly transferred to a subsequent process step. The positioning roll 13 has its rotary shaft mounted in a vertically swingable arm, and therefore forces the arm to swing downward under the influence of its weight acting on the arm. Due to this action, the positioning roll 13 is brought into press-contact with an upper surface of the folded sheet 10. As a result, the positioning roll 13 serves in function as a dancer roll for controlling the folded sheet 10 in tension. More specifically, when the tension of the folded sheet 10 increases, the positioning roll (i.e., dancer roll) 13 is moved up. On the other hand, when the tension of the folded sheet 10 decreases, the positioning roll or dancer roll 13 is moved down. The positioning roll 13 may be eliminated, if necessary.

On the other hand, as shown in FIG. 9, the intermittently feeding roll 14 is used to intermittently feed the folded sheet 10 to a subsequent process step, and is driven by an intermittent drive motor 16. In operation, the folded sheet 10 is sandwiched between the intermittently feeding roll 14 and a lever roll 15 associated with the intermittently feeding roll 14, and is intermittently fed to a slitting machine 17. This slitting machine 17 is disposed under the intermittently feeding roll 14 which serves as a second feed means. Incidentally, in operation, when the intermittently feeding roll 14 rotates intermittently, the folded sheet 10 is alternately stretched and relaxed in an area between the second conveyor 12 and the intermittently feeding roll 14.

Figure 14:
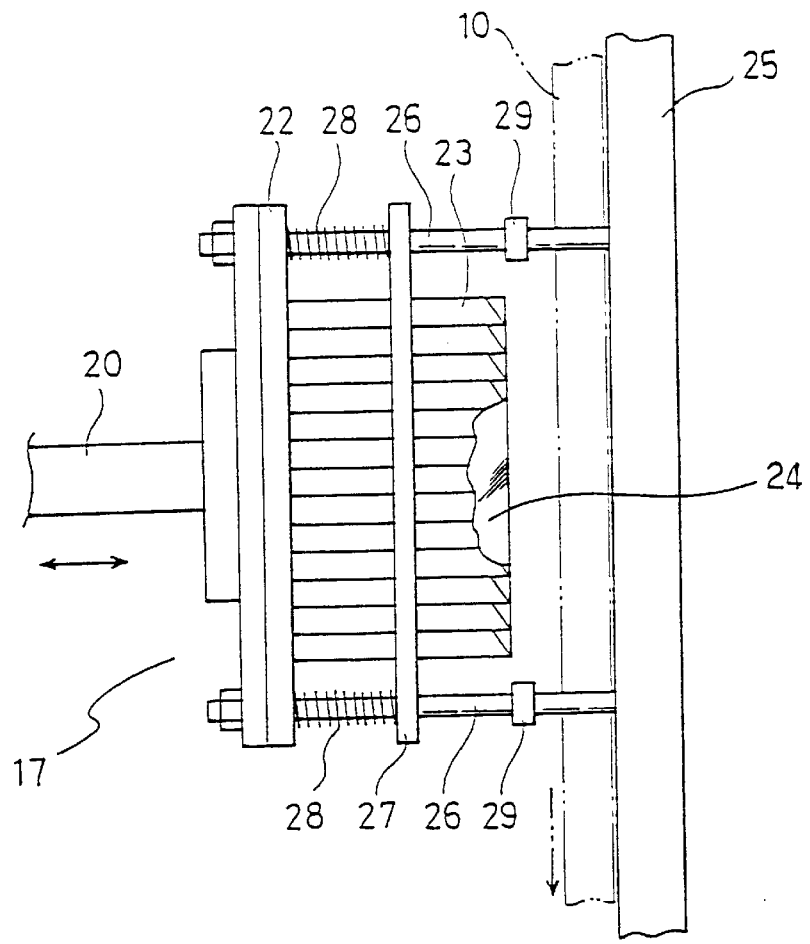
FIG. 14 is a schematic side view of a slitting machine used in the apparatus of the present invention shown in FIG. 9.

FIG. 14 shows a schematic side view of the slitting machine 17 used in the apparatus of the present invention shown in FIG. 9. The slitting machine 17 is used to form a plurality of rows of parallel oblique slits 23*a* in the folded sheet 10 so as to have the rows of the parallel oblique slits 23*a* symmetrically arranged about a longitudinal axis of the folded sheet 10, wherein the parallel oblique slits 23*a* are spaced apart from each other at predetermined narrow intervals in each of the rows to assume the shape of a feathery-branched block 10*d* shown in FIG. 18(*h*).

In FIG. 14, the reference numeral 20 denotes a drive lever. The drive lever 20 is driven by a pneumatic cylinder 21 and like actuators, and has its end portion fixed to a blade mounting plate 22. Fixedly mounted on the blade mounting plate 22 are a plurality of cutting blade assemblies 23, 24 which have their blade tips horizontally oriented, as shown in FIG. 14. Of these cutting blade assemblies 23 and 24, the cutting blade assembly 23 is constructed of a plurality of rows of parallel oblique blade elements, wherein: the rows of the parallel oblique blade elements are symmetrically arranged about a longitudinal axis of the cutting blade assembly 23; and, the parallel oblique blade elements are spaced apart from each other at predetermined narrow intervals in each of the rows to assume a feathery-branched block shape.

On the other hand, the remaining cutting blade assembly 24 is constructed of a plurality of vertical straight blade elements which extend in the longitudinal direction of the cutting blade assembly 23 between adjacent ones of the rows in the cutting blade assembly 23. These cutting blade assemblies 23, 24 are combined into a single cutting unit, and moved in a horizontal direction to form a plurality of slits 23*a*, 24*a* in the folded sheet 10 which is vertically transferred downward from above, so that the folded sheet 10 thus provided with the slits 23*a*, 24*a* assumes the tissue of a crab's leg meat in appearance, as shown in FIG. 18(*f*). Incidentally, in the cutting blade assembly 24, its vertical straight blade elements intermittently arranged may be connected in series to form a single continuous blade, if necessary. The cutting blade assembly 24 for forming the longitudinal slits in the central area of the folded sheet 10 may be eliminated.

Figure 15:
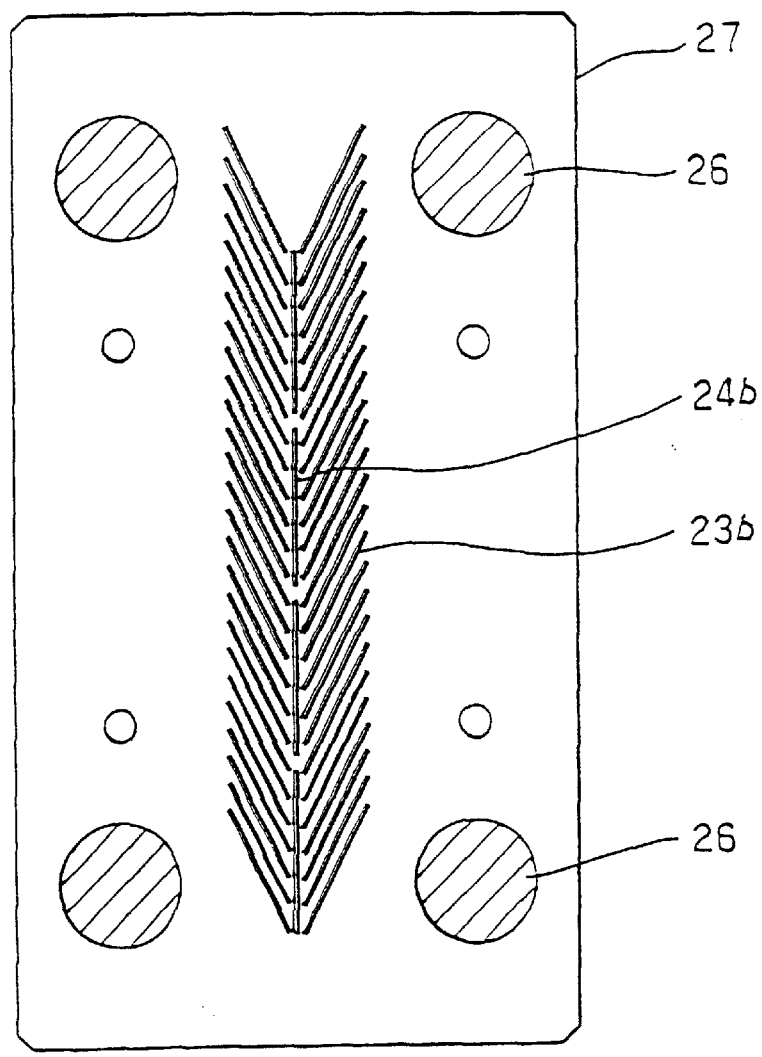
FIG. 15 is a plan view of a blade supporting plate used in the slitting machine shown in FIG. 14.

As shown in FIG. 14, the blade mounting plate 22 is supported by four pieces of guide posts 26 fixedly mounted on a side plate 25 which is vertically mounted on a base frame (not shown) of the slitting machine 17. Each of these guide posts 26 is inserted into a through-hole of a blade support plate 27 and slidably supported thereby. Slidably mounted on each of the guide posts 26 between the blade mounting plate 22 and the blade support plate 27 is a compression coil spring 28, which has its opposite ends fixedly mounted on the blade mounting plate 22 and the blade support plate 27, respectively. As shown in FIG. 15, the blade support plate 27 is provided with a plurality of elongated holes 23b and 24b, each of which is similar to in shape but slightly larger in area than the cross section of a corresponding one of the blade elements of the blade assemblies 23 and 24, to permit these blade elements to pass through the corresponding elongated holes 23b, 24b of the blade support plate 27, so that the blade elements of the blade assemblies 23, 24 are smoothly guided by the corresponding elongated holes 23b, 24b of the blade support plate 27, and prevented from vibrating when the slits 23a, 24a are formed in the folded sheet 10.

As is clear from FIG. 14, a large-diameter portion serving as a stopper means 29 is provided in a substantially intermediate portion of each of the guide posts 26 to limit a traveling distance or stroke of the blade support plate 17 in a horizontal direction relative to the guide posts 26. Due to the presence of the stopper means 29, there is no fear that the blade support plate 27 is brought into contact with the folded sheet 10 to contaminate or damage the same. Incidentally, when the blade support plate 27 moves to its extreme rightward position as viewed in FIG. 14, the blade elements of the blade assemblies 23, 24 are brought into contact with the side plate 25 to form the slits 23a, 24a in the folded sheet 10, as shown in FIG. 18(f). When these slits 23, 24a are formed in the folded sheet 10, the intermittently feeding roll 14 used to intermittently feed the folded sheet 10 to a subsequent process step stops in operation to stop the delivery of the folded sheet 10.

The slitting machine 17 shown in FIG. 14 is capable of forming the plurality of the slits 23a, 24a at once. It is also possible for the slitting machine 17 to have a selected one or ones of the cutting blade elements of its blade assemblies 23, 24 horizontally moved to form the corresponding one or ones of the slits 23a, 24a in the folded sheet 10. In forming such one or ones of the slits 23a, 24a in the folded sheet 10, the folded sheet 10 is intermittently fed as is in the above. At this time, the selected one of ones of the cutting blade elements of the blade assemblies 23, 24 may be moved in a vertical direction and also moved reciprocally in a horizontal direction. Alternatively, in forming the slits 23a, 24a in the folded sheet 10, it is also possible to permit the cutting blade elements of the blade assemblies 23, 24 to stay in the same horizontal plane and reciprocally moved in that plane when the folded sheet 10 is continuously fed without using the intermittently feeding means or roll 14.

Figure 16:
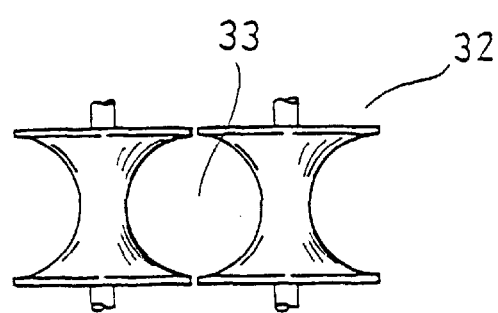
FIG. 16 is a front view of a pair of forming rolls used in the apparatus of the present invention shown in FIG. 9.

The folded sheet 10a thus provided with the slits 23a, 24a shown in FIG. 18(f) is then transferred to a subsequent cutting process step by means of a transfer conveyor 31. As is clear from FIG. 9, the folded sheet 10a is passed through a forming roll assembly 32 when transferred by the transfer conveyor 31, so that the folded sheet 10a is compressed and formed into a cylindrical body 10c, which has a predetermined diameter and is sufficiently packed in tissue, as shown in FIG. 18(g). As shown in FIG. 16, the forming roll assembly 32 is constructed of a pair of oppositely disposed rolls which define a round pass 33 therebetween for forming the folded sheet 10b into the cylindrical body 10c. As shown in FIG. 9, preferably, an additional forming roll assembly 32 is provided to ensure that the folded sheet 10b is formed into the cylindrical body 10c with precision.

Figure 17:
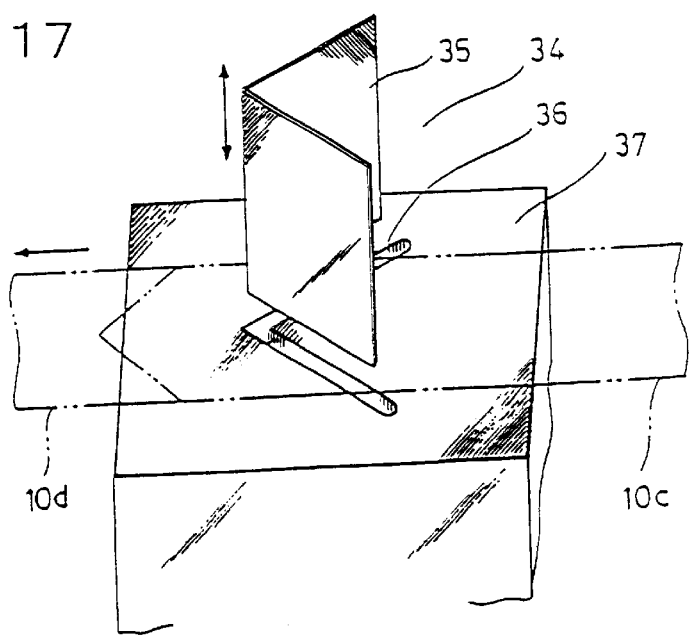
FIG. 17 is a perspective view of a cutter used in the apparatus of the present invention shown in FIG. 9.

Provided over the downstream-side end portion of the transfer conveyor 31 is a cutter 34 for cutting the cylindrical body 10c into a plurality of feathery-branched blocks 10d. As is clear from FIG. 18(h), each of the feathery-branched blocks 10d with a predetermined axial length has one of its opposite end portions cut into a V-shaped concave portion and the other into a V-shaped convex portion. As shown in FIG. 17, the cutter 34 is provided with a V-shaped or U-shaped cutter blade 35, which is driven by a pneumatic cylinder and like actuators to move up and down. FIG. 17 shows a V-shaped type of the cutter blade 35. The cutter 34 is also provided with a socket mount 37. The cylindrical body 10c, which is provided with the slits 23a, 24a (i.e., the parallel oblique slits 23a symmetrically formed in the folded sheet 10b and the longitudinal slits 24a formed in the central area of the folded sheet 10b) and passed through the forming roll assemblies 32, is delivered to the socket mount 37. Then, in this socket mount 37, the cylindrical body 10c is cut into the plurality of the feathery-branched blocks 10d shown in FIG. 18(h), so that the feathery-branched blocks 10d each having a predetermined axial length are continuously produced.

The feathery-branched blocks 10d each having the predetermined axial length thus cut in the cutter 34 are then fed from the transfer conveyor 31 to a high-speed conveyor 39 continuously in a condition in which these feathery-branched blocks 10d are substantially adjacent to each other. Since the high-speed conveyor 39 is larger in transfer speed than the transfer conveyor 31, the feathery-branched blocks 10d are spaced apart from each other at predetermined equal intervals on the high-speed conveyor 39, and further transferred to subsequent coloring and packaging process steps which are similar to those of the prior art and therefore not described here to avoid redundancy in description. Incidentally, in the coloring process step, each of the feathery-branched blocks 10d is wrapped with a color wrapping film to have its opposite end portions (which assume the V-shaped concave and the V-shaped convex shape, respectively, as described above) rounded, as shown in FIG. 18(i).

The above embodiment of the apparatus of the present invention assumes a horizontally elongated shape, as is clear from FIGS. 9 and 10. In this embodiment of the apparatus of the present invention, although the paste sheet 2 is transferred linearly (i.e., moved through a straight path) until it is formed into the feathery-branched blocks 10d, it is also possible to move the paste sheet through an L-shaped path instead.

Figure 19:
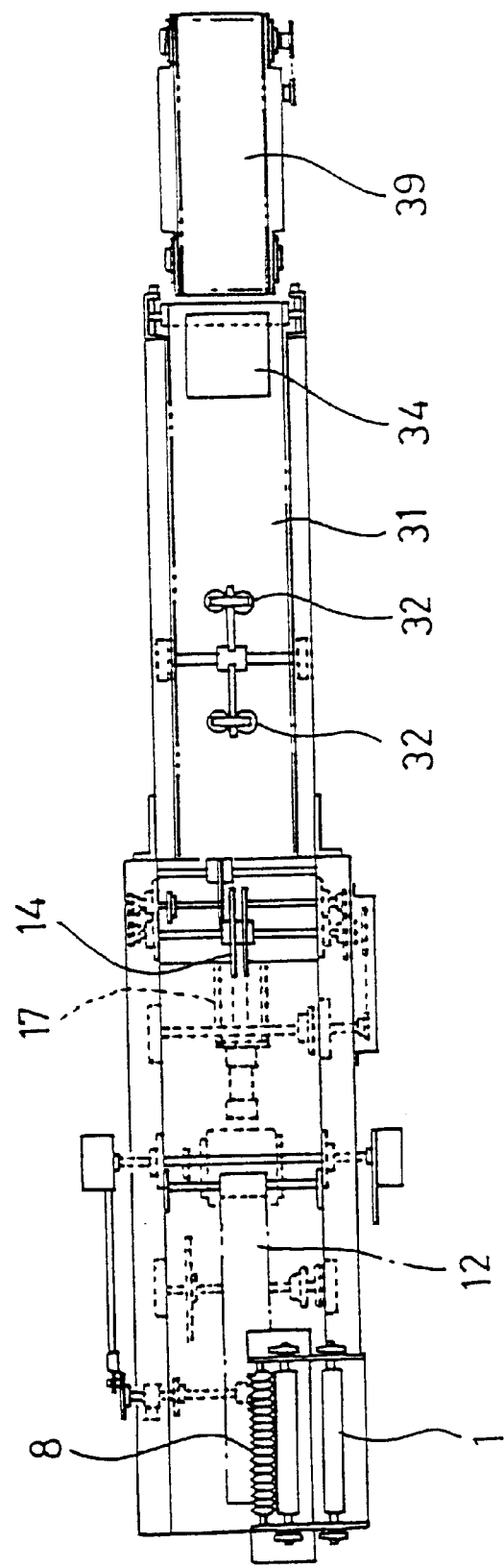
FIG. 19 is a plan view of a second embodiment of the apparatus of the present invention, illustrating the saw-toothed roll for bending the paste sheet along its partitioning lines into a saw-toothed shape in cross section, wherein the saw-toothed roll has its longitudinal axis aligned with a direction in which the second conveyor 12 travels.
Figure 20:
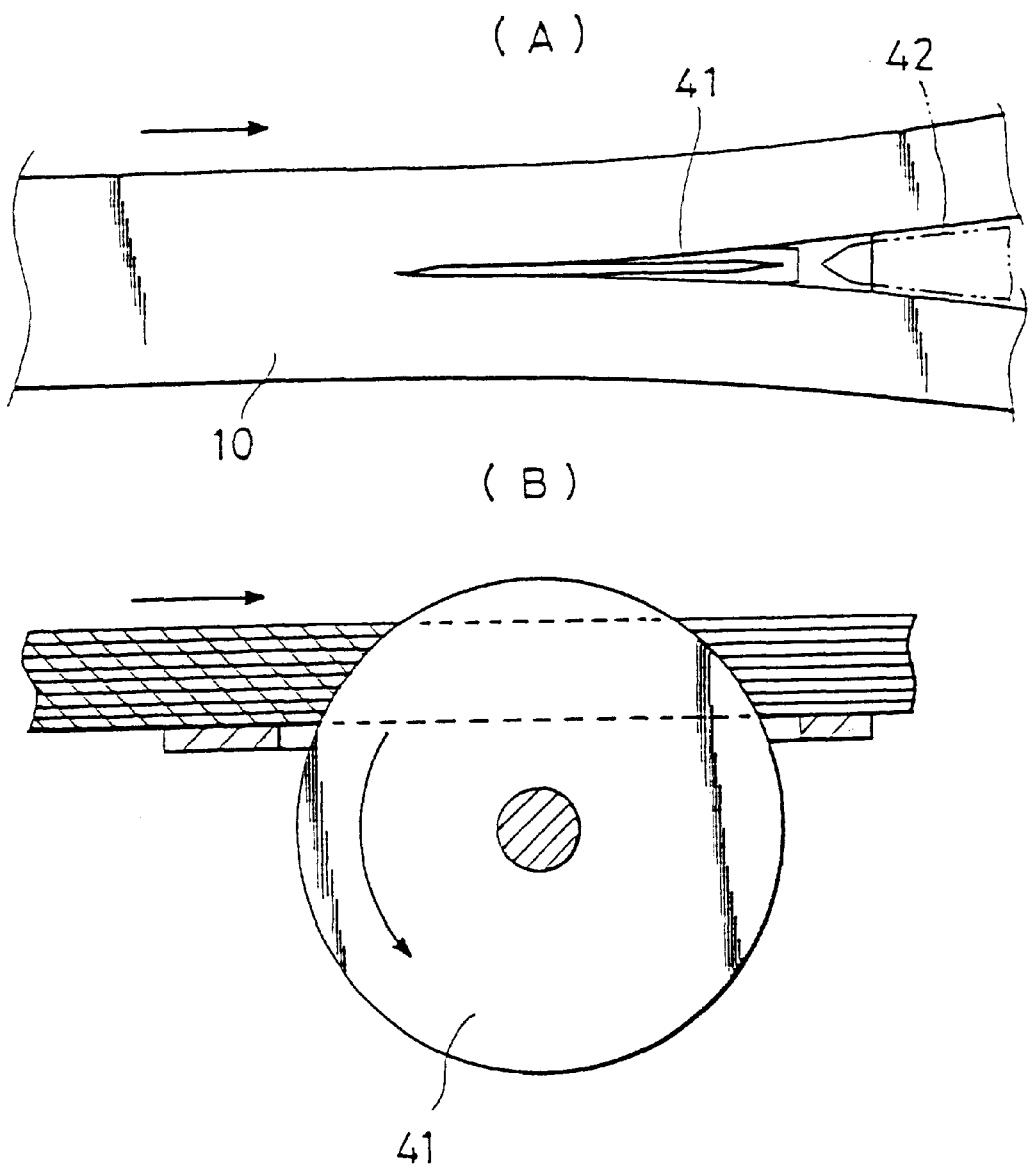
FIG. 20 is a plan and side view of the rotary cutter for cutting the folded sheet.

More specifically, as is clear from FIG. 19, in a second embodiment of the apparatus of the present invention, in order to move the paste sheet 2 through such an L-shaped path, the transfer conveyor 12 has its transferring direction be perpendicular to that of the first feed conveyor 1 for transferring the paste sheet 2. In the second embodiment of the apparatus of the present invention having the above construction, in operation, the paste sheet 2 moves downward through the convergent roll assembly 9 to become the folded sheet 10 which is then straightly fed to the transfer conveyor 12 without being twisted through an angle of 90 degrees. Consequently, the second embodiment of the apparatus of the present invention is not provided with the twist roll 11 in contrast with the first embodiment of the apparatus of the present invention.

In any of the embodiments of the apparatus of the present invention described above, there is provided a single production line for producing a single folded sheet 10. However, it is also possible to provide a plurality of production lines in the apparatus of the present invention by longitudinally dividing the folded sheet 10 into a plurality of elongated pieces. In this case, it is necessary for the folded sheet 10 to have a sufficient width, which permits a rotary cutter 41 to divide the folded sheet 10 into the plurality of the elongated pieces each serving as the folded sheet 10 used in the first and the second embodiment of the apparatus of the present invention. As is clear from FIG. 29(A), the rotary cutter 41 is disposed in front of a wedge-shaped separator 42. Both the rotary cutter 41 and the wedge-shaped separator 42 are interposed between the transfer conveyor 12 and the intermittently feeding roll 14. The wedge-shaped separator 42 is used to widely separate the elongated pieces thus divided by the rotary cutter 41 from each other, and may be eliminated, if necessary.

The elongated pieces thus divided by the rotary cutter 41 is processed in the same manner as that of the folded sheet processed in each of the first and the second embodiment of the apparatus of the present invention. Consequently, in this modification of the embodiment of the apparatus of the present invention, it is natural that the number of each of the intermittently feeding rolls 14, slitting machines 17, forming roll assemblies 32, cutters 34 and like components is the same as that of the elongated pieces thus divided by the rotary cutter 41, as is clear from FIGS. 9 and 20(A). It is natural that the modification having the above construction is superior in production efficiency to any of the first and the second embodiment of the apparatus of the present invention.

As is clear from the above, the method and the apparatus of the present invention can produce the paste food product in more efficient way and in a shorter time than conventional methods and apparatuses.

What is claimed is:

1. An apparatus for producing a paste food product resembling in appearance a crab's leg meat tissue, comprising:

- a sheet cutter assembly constructed of a plurality of parallel rotary cutters which are arranged side by side and disposed under a first feed means for feeding a paste sheet;
- a convergent roll assembly for forming said paste sheet into a folded sheet, said convergent roll assembly having an H-shaped cross section and being disposed under said first feed means;
- a conveyor for conveying said folded sheet, said conveyor being disposed under said convergent roll assembly;
- a second feed means for intermittently or continuously feeding said folded sheet, said second feed means being disposed in front of said conveyor;
- a slitting machine, which is disposed under said second feed means, for forming a plurality of rows of parallel oblique slits in said folded sheet so as to have said rows of said parallel oblique slits symmetrically arranged about a longitudinal axis of said folded sheet, said parallel oblique slits being spaced apart from each other at predetermined narrow intervals in each of said rows to assume a feathery-branched block shape; and
- a cutter for cutting said folded sheet provided with said parallel oblique slits into a plurality of blocks each having a predetermined length and each resembling in appearance a crab's leg meat tissue, said cutter being disposed over an end portion of said conveyor.

2. The apparatus for producing the paste food product resembling in appearance the crab's leg meat tissue, according to claim 1, wherein: a saw-toothed roll for bending said paste sheet along its partitioning lines into a saw-toothed shape in cross section is provided between said sheet cutter assembly and said convergent roll assembly.

3. The apparatus for producing the paste food product resembling in appearance the crab's leg meat tissue, according to claim 1, wherein: a twist roll for twisting said folded sheet through an angle of 90 degrees is disposed under said convergent roll assembly.

4. The apparatus for producing the paste food product resembling in appearance the crab's leg meat tissue, according to any one of claims 1 to 3, wherein: a forming means for slightly compressing said folded sheet into a circular shape in cross section is disposed in an intermediate area of said conveyor extending from a lower area of said slitting machine.

\* \* \* \* \*